United States Patent
Pals et al.

(10) Patent No.: US 8,300,680 B2
(45) Date of Patent: Oct. 30, 2012

(54) APPARATUS AND METHOD FOR DYNAMIC SCALING OF ADC SAMPLING RATE TO AVOID RECEIVER INTERFERENCE

(75) Inventors: Timothy Paul Pals, San Diego, CA (US); Soon-Seng Lau, San Diego, CA (US); Lennart K. Mathe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 12/615,052

(22) Filed: Nov. 9, 2009

(65) Prior Publication Data

US 2010/0316098 A1    Dec. 16, 2010

Related U.S. Application Data

(60) Provisional application No. 61/186,308, filed on Jun. 11, 2009.

(51) Int. Cl.
*H04B 1/38* (2006.01)
*H04L 5/16* (2006.01)

(52) U.S. Cl. ........ 375/219; 375/222; 375/346; 375/285; 341/155; 455/63.1; 455/570; 455/296

(58) Field of Classification Search .................. 375/219, 375/222, 220, 346, 285, 350, 232, 231; 341/155; 455/63.1, 570, 296
See application file for complete search history.

(56) References Cited

U.S. PATENT DOCUMENTS

| 7,545,306 B2 * | 6/2009 | Frederick et al. ............. 341/155 |
| 2004/0161062 A1 | 8/2004 | Richey et al. |
| 2007/0104298 A1 | 5/2007 | Filipovic et al. |

FOREIGN PATENT DOCUMENTS

| EP | 1303053 | 4/2003 |
| EP | 1655848 | 5/2006 |
| WO | WO2008009007 | 1/2008 |
| WO | WO2008117130 | 10/2008 |
| WO | WO2010042763 | 4/2010 |

OTHER PUBLICATIONS

International Search Report and Written Opinion—PCT/US2010/038392, International Search Authority—European Patent Office—Oct. 19, 2010.

* cited by examiner

*Primary Examiner* — Phuong Phu
(74) *Attorney, Agent, or Firm* — Shyam K. Parekh; Howard H. Seo

(57) ABSTRACT

A method and apparatus for avoiding receiver interference is described herein. One or more potential interferers are determined and the frequency associated with the interferers is also determined A desired sampling frequency for the receiver is calculated to avoid the potential interferers.

27 Claims, 9 Drawing Sheets

APPARATUS AND METHOD FOR DYNAMIC SCALING OF ADC SAMPLING RATE TO AVOID RECEIVER INTERFERENCE

CLAIM OF PRIORITY UNDER 35 U.S.C. §119

The present Application for Patent claims priority to Provisional Application No. 61/186,308 entitled "Apparatus and Method for Dynamic Scaling of ADC Sampling Rate to Avoid Receiver Interference" filed Jun. 11, 2009, and assigned to the assignee hereof and hereby expressly incorporated by reference herein.

BACKGROUND

1. Field

This disclosure relates generally to communication, and more specifically to techniques for scaling the sampling rate of an analog-to-digital converter.

2. Background

Wireless communication systems are widely deployed to provide various communication services such as broadcast, voice, video, packet data, messaging, etc. These wireless systems include broadcast systems, cellular systems, etc. A wireless system may operate in an environment where jammers may be present. Jammers are large amplitude undesired signals. The jammers may correspond to strong narrowband frequency components (e.g., for color carrier, sound carrier, etc.) from an interfering source or intermodulation distortion generated by a receiver. The jammers may cause various deleterious effects such as failure to detect and acquire a signal from a desired system, degradation in decoding performance, etc.

Analog filters are often used in a receiver to pass the desired signal while suppressing out-of-band jammers that couple to the antenna. Any residual jammer energy remaining prior to an analog-to-digital conversion can potentially alias into the signal band. This may cause a degradation in receiver sensitivity, bit rate error, and/or other types of signal degradation.

Analog-to-digital (ADC) and other digital logic clocked at the ADC sampling rate may also degrade receiver performance For example, a sample clock may have a harmonic falling inside the RF signal bandwidth of one of the active receivers in a user device. Digital signals in the sample clock domain may couple to sensitive low noise amplifier (LNA) and/or mixer circuits, where a harmonic component creates an in-band jammer.

Another common problem is that the sampling clock, or other digital signals in the sample clock domain may couple into the receiver synthesizer, thereby modulating the VCO control voltage. As a result, spurious components may be presented in the VCO output. These spurious components may create continuous wave (CW) jammers at the receiver output and/or other broadband interference resembling jammer aliasing.

There is a need in the art for improved techniques for avoiding jammer aliasing and other similar interference.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one aspect, a method for avoiding receiver interference comprises determining, by a processor, the processor interfacing to a first receiver having a radio frequency integrated circuit (RFIC) and a baseband integrated circuit (IC) separate from the RFIC, the sampling frequency of the first receiver to avoid one or more potential interference signals occupying the desired baseband signal bandwidth of the first receiver, wherein a clock signal is routed between the RFIC and the baseband IC; selecting a desired sampling frequency such that at least one of the one or more potential interference signals does not substantially interfere with the first receiver; and setting the sampling frequency to the desired sampling frequency.

According to one aspect, at least one processor interfacing to a first receiver having an RFIC and a baseband IC separate from the RFIC, wherein a clock signal is routed between the RFIC and the baseband IC, the at least one processor configured to avoid receiver interference comprises a first module for determining the sampling frequency of the first receiver to avoid one or more potential interference signals occupying the desired baseband signal bandwidth of the first receiver, a second module for selecting a desired sampling frequency such that at least one of the one or more potential interference signals does not substantially interfere with the first receiver, and a third module for setting the sampling frequency to the desired sampling frequency.

According to one aspect, a computer program product comprises a computer-readable medium comprising a processor interfacing to a first receiver having an RFIC and a baseband IC separate from the RFIC, the computer-readable medium further comprising a first set of codes for causing a computer to determine the sampling frequency of the first receiver to avoid one or more potential interference signals occupying the desired baseband signal bandwidth of the first receiver, a second set of codes for causing the computer to select a desired sampling frequency such that at least one of the one or more potential interference signals does not substantially interfere with the first receiver, and a third set of codes for causing the computer to set the sampling frequency to the desired sampling frequency.

According to one aspect, an apparatus comprises a first receiver having an RFIC and a baseband IC separate from the RFIC, wherein a clock signal is routed between the RFIC and the baseband IC; means for the sampling frequency of the first receiver to avoid one or more potential interference signals occupying the desired baseband signal bandwidth of the first receiver, wherein a clock signal is routed between the RFIC and the baseband IC, means for selecting a desired sampling frequency such that at least one of the one or more potential interference signals does not substantially interfere with the first receiver, and means for setting the sampling frequency to the desired sampling frequency.

According to one aspect, an apparatus comprises a first receiver comprising an RFIC; a baseband IC, the baseband IC separate from the RFIC; a clock signal routed between the RFIC and the baseband IC; at least one processor configured to dynamically adjust the sampling frequency of a receiver to avoid one or more potential interference signals occupying the desired baseband signal bandwidth, and a memory coupled to the at least one processor.

To the accomplishment of the foregoing and related ends, the one or more aspects comprise the features hereinafter fully described and particularly pointed out in the claims. The following description and the annexed drawings set forth in detail certain illustrative features of the one or more aspects.

These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
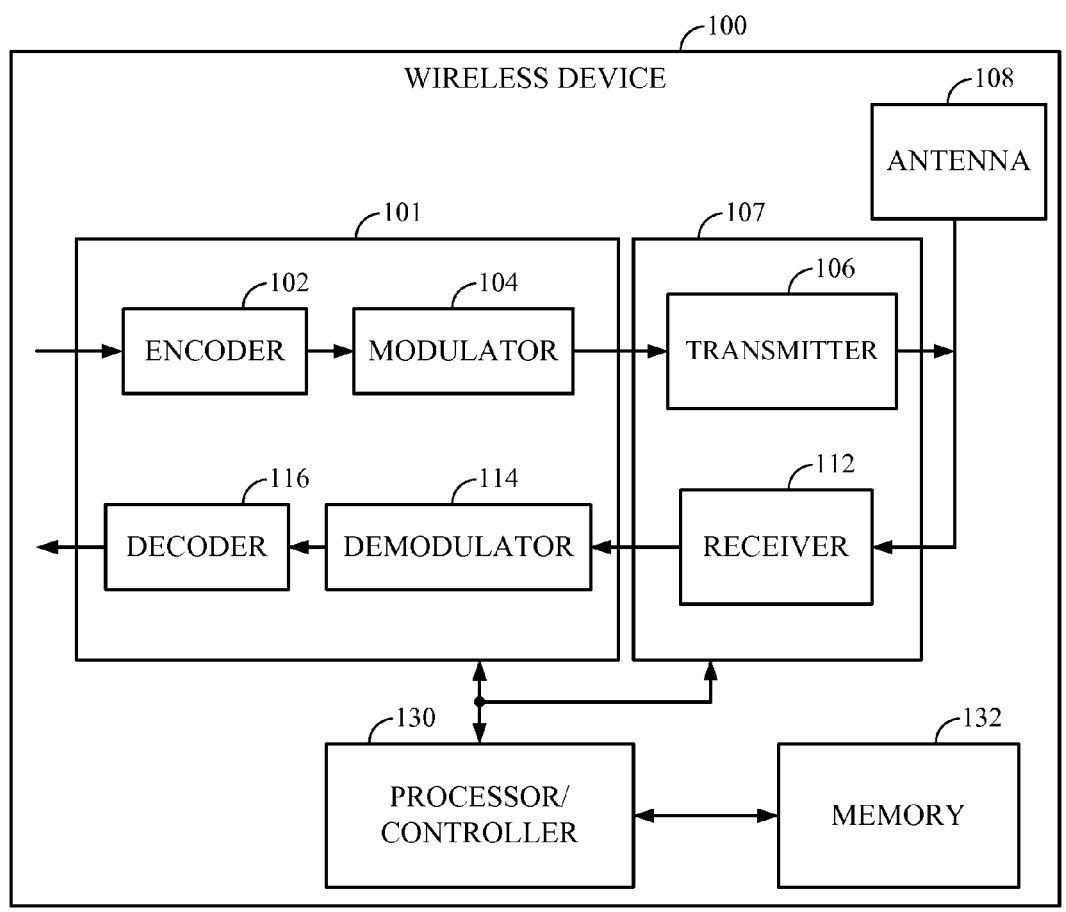
FIG. 1 depicts a block diagram of a wireless device that can be employed in conjunction with the various systems and methods described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, Bluetooth and any other short- or long-range wireless communication techniques. The techniques described herein may be applied to broadcast applications such as MediaFLO, DVB-H, ISDB-T, DMB, and/or other broadcast receiver protocols.

The techniques described herein may also be used in radio-navigation applications. For example, navigation receiver protocols, including GNSS systems such as GPS, GLONASS, Compass, and Galileo, as well as regional systems such as QZSS (Japan) and IRNSS (India) may be used.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 shows a block diagram of a wireless device 100. On the transmit path, traffic data and signaling to be sent by wireless device 100 are processed (e.g., formatted, encoded, and interleaved) by an encoder 102 and further processed (e.g., modulated, spread, channelized, and scrambled) by a modulator 104 to obtain a stream of data chips. A transmitter unit 106 then conditions (e.g., converts to analog, filters, amplifies, and frequency upconverts) the data chip stream to generate an uplink signal, which is transmitted via an antenna 108. On the receive path, downlink signals transmitted by base stations in a WWAN and/or access points in a WLAN are received by antenna 108 and provided to a receiver unit 112. Receiver unit 112 conditions (e.g., filters, amplifies, and frequency downconverts) the received signal and further digitizes the conditioned signal to obtain data samples. A demodulator 114 processes (e.g., descrambles, despreads, channelizes, and demodulates) the data samples to obtain symbols. A decoder 116 further processes (e.g., deinterleaves and decodes) the symbols to obtain decoded data. Encoder 102, modulator 104, demodulator 114, and decoder 116 may be implemented by a modem processor. These units perform processing in accordance with the technology used by the WWAN or WLAN system with which wireless device 100 communicates.

Encoder 102, modulator 104, demodulator 114, and decoder 116 may be components of a modem 101. Transmitter 106 and receiver 112 may be located on RFIC 107. According to some aspects transmitter 106 and receiver 112 may each be located on a separate RFIC.

A processor/controller 130 directs the operation of various units within wireless device 100. Processor/controller 130 may implement processes described herein for calculating and dynamically adjusting a receiver's sampling frequency. A memory unit 132 stores program codes and data used by processor/controller 130 and other units.

Figure 2A:
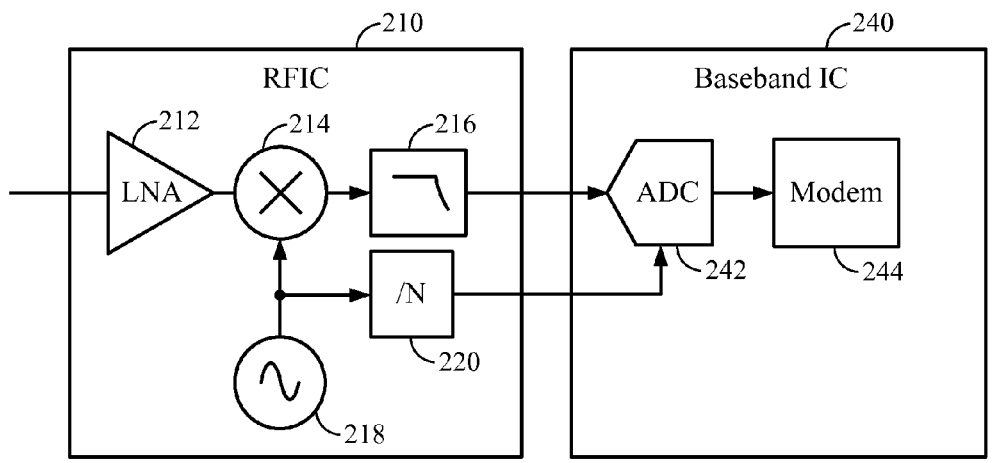
FIGS. 2A-2C depict various apparatus that can be employed in conjunction with the various systems and method described herein.
Figure 2B:
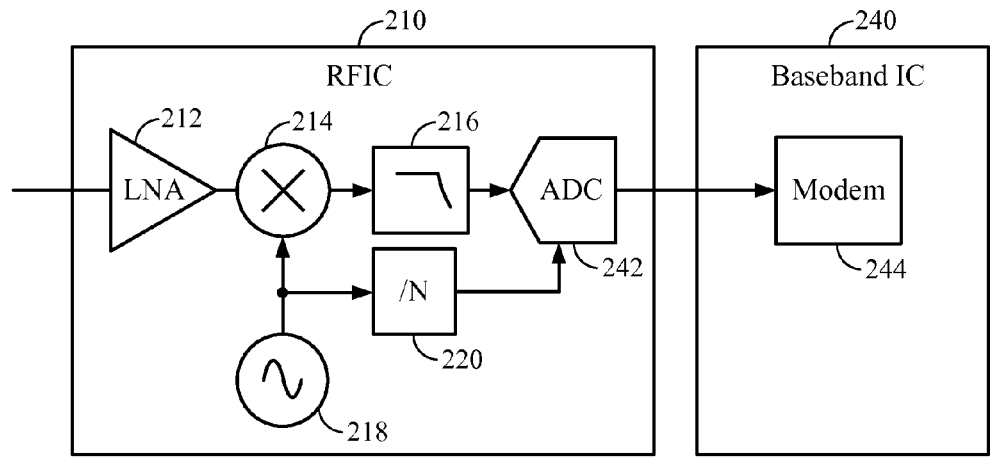
Figure 2C:
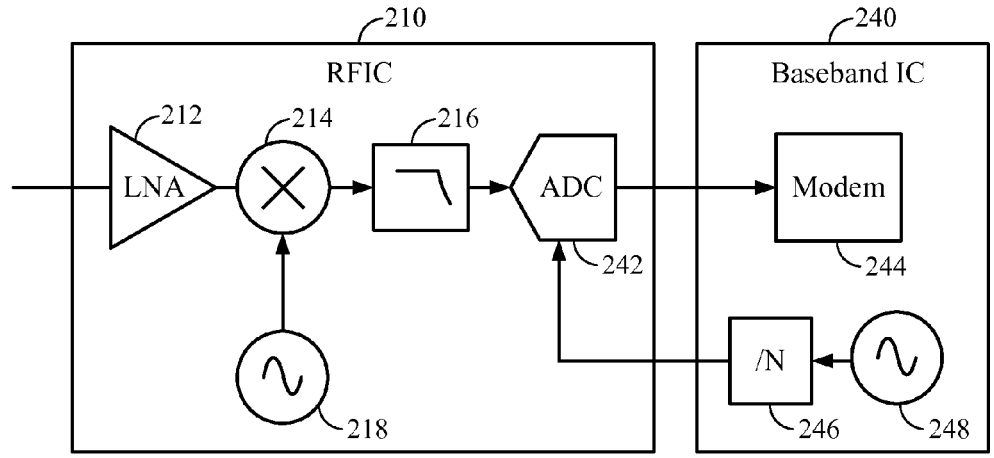

FIGS. 2A-2C are block diagrams depicting various apparatus for implementing the systems and methods described herein. As depicted in FIG. 2A, an RFIC 210 is coupled to a baseband IC 240. The RFIC 210 may include an amplifier 212, mixer 214, filter 216, oscillator 218, and divider 220. Baseband IC 240 may include an ADC 242 and modem 244. As depicted in FIG. 2A, analog data may be transmitted across the printed circuit board which holds both the RFIC 210 and the baseband IC 240. A clock signal may be generated in RFIC 210, and may also be routed across the circuit board to baseband IC 240.

In FIG. 2B, ADC 242 is located on the RFIC 210 rather than on the baseband IC 240. Clock and data signals may be generated at the RFIC 210 and routed across the circuit board to baseband IC 240. In the implementation depicted in FIG. 2C, the ADC 242 is located on the RFIC 210. The baseband IC 240 may include a divider 246 and oscillator 248. In this implementation, the clock signal may be generated in the baseband IC 240 and routed across the circuit board to RFIC 210. It is noted that the specific configurations depicted in FIGS. 2A-2C are merely exemplary. Other configurations may also be used.

Figure 3:
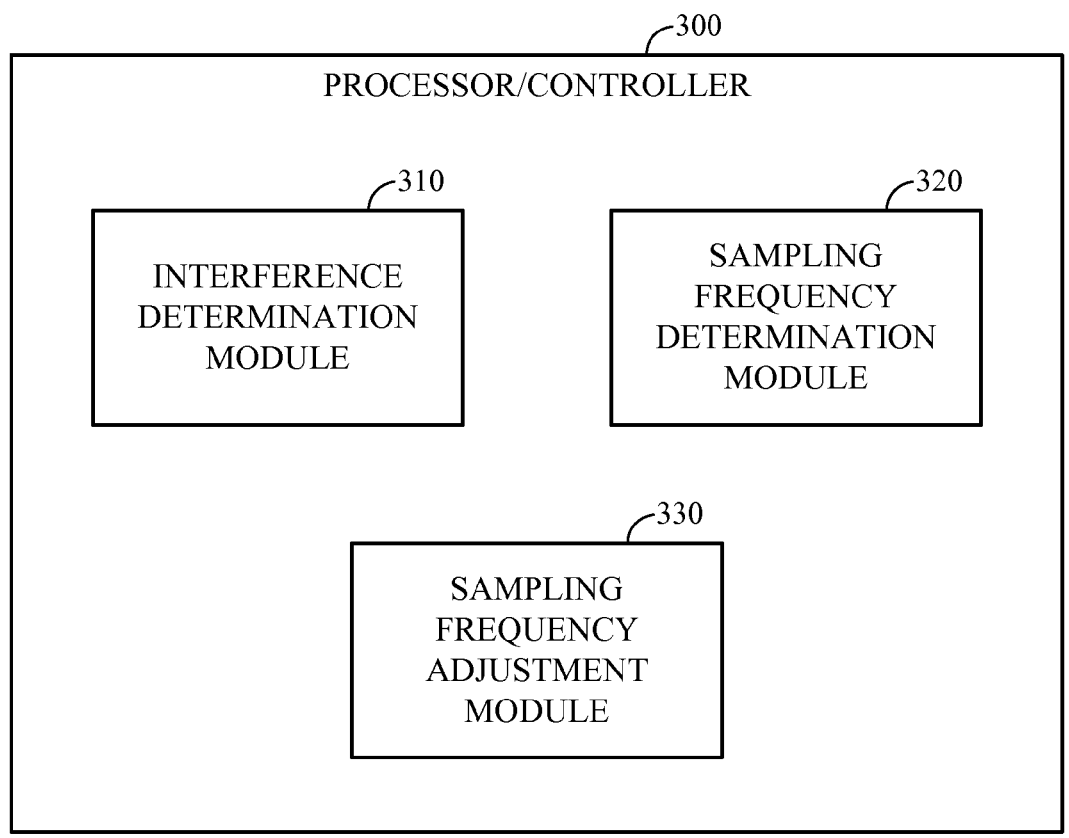
FIG. 3 depicts a block diagram of a processor/controller in accordance with various aspects disclosed herein.

A wireless device may include one or more receivers and/or one or more transmitters. As a result of the close coupling of the electronic components, interference signals may occupy a receiver's desired signal bandwidth. For example, interference signals may be generated as a result of a portion of a transmitter's signal leaking into the receiver front-end circuitry and subsequently aliasing in the receiver ADC, harmonics of a co-located receiver's sampling clock falling in the receiver's RF signal bandwidth, LO spurs generated by the receiver's sampling clock mixing with a signal leaking from a co-located transmitter, and/or other interference sources. Dynamically selecting a sampling frequency, based on the frequencies in use by all co-located device elements, may be used to prevent interference. FIG. 3 depicts processor/controller 300 for controlling a wireless device, in accordance with some aspects. Processor/controller 300 may include an interference determination module 310, a sampling frequency determination module 320, and a sampling frequency adjustment module 330.

Interference determination module 310 may be configured to determine the source of one or more potential interfering signals. For example, interference determination module may be configured to determine whether there are potential interferences sources such as co-located transmitters and/or receivers which may generate signals which could alias into the desired receiver signal band. Interference determination module 310 may also be configured to determine the frequency of any potential interferers. For example, if there is a potential for a jammer signal to be received as a result of transmitter leakage, the interference determination module 310 may be configured to determine the frequency of the transmitter oscillator. For co-located receivers, the interference determination module 310 may be configured to determine the operating frequency of each co-located receiver. When a jammer is generated by a co-located receiver or transmitter in an integrated chipset, software and/or firmware controlling the receiver may also be used to control the co-located receiver or transmitter. Accordingly, frequency information and/or band and channel information associated with the co-located receiver or transmitter may be passed to the code module associated with the receiver in real time. In some aspects, the receiver code module may periodically request frequency information from code modules associated with the co-located receiver or transmitter via a high-level application programming interface (API). In some aspects, a real-time spectrum analyzer may be used to determine frequency information for any potential interferers. Other methods may also be used.

Based on the interference information determined by interference determination module 310, sampling frequency determination module 320 may be configured to determine an ADC sampling frequency which will avoid interference. According to some aspects, an appropriate sampling frequency may be determined by consulting a look-up table which stores a precomputed sampling frequency for all channels of a potential interference source. For example, for a receiver co-located with a transmitter that operates in one of ten transmitter channels, a desired sampling frequency associated with those ten transmitter channels may be stored in a table. For example, the sampling frequency for each channel in the table may be determined by calculating the alias frequency of the transmitter leakage in that channel for all candidate sampling frequencies and selecting one sampling frequency that avoids aliasing into the desired signal bandwidth.

In accordance with some aspects, sampling frequency determination module 320 may be configured to calculate a desired sampling rate without consulting a look-up table. The sampling frequency determination module 320 may be configured to calculate a sampling frequency $F_S$ which avoids all potential interference. For example, in the case of potential interference due to transmitter leakage, a jammer at baseband frequency $F_J = N * F_S + \Delta F$, where N is an integer and $|\Delta F| < F_S/2$, will appear at the ADC output as if its baseband frequency were actually $\Delta F$. Thus, sampling frequency determination module 320 may be configured to select a value for $F_S$, based on the above-identified equation, such that the aliased jammer is sufficiently far from the signal bandwidth.

In the case of harmonics generated by a co-located receiver's sampling clock, the sampling frequency determination module 320 may be configured to select a sampling frequency $F_S$ for the co-located receiver such that no multiple $N*F_S$ falls inside the RF signal bandwidth for any active receiver in the device. In the case of LO spurs generated by the receiver's sampling clock mixing with a signal leaking from a co-located transmitter, a sampling frequency $F_S$ may be determined such that no mixing products of the transmitter leakage with LO spurs at frequency offsets $N*F_S$ will fall into the desired signal bandwidth. According to some aspects, the sample frequency determination module 320 selects a sampling frequency which avoids interference caused by all potential mechanisms. In other embodiments, fewer than all potential mechanisms may be considered.

Sampling frequency adjustment module 330 may be configured to determine when an adjustment to the sampling frequency is desirable. For example, the module may determine that an adjustment is desirable when a user device is powered on, when there is a signal handoff, when there is a communications channel change, when a voice or data call is originated or terminated, and/or other desirable times.

Figure 4:
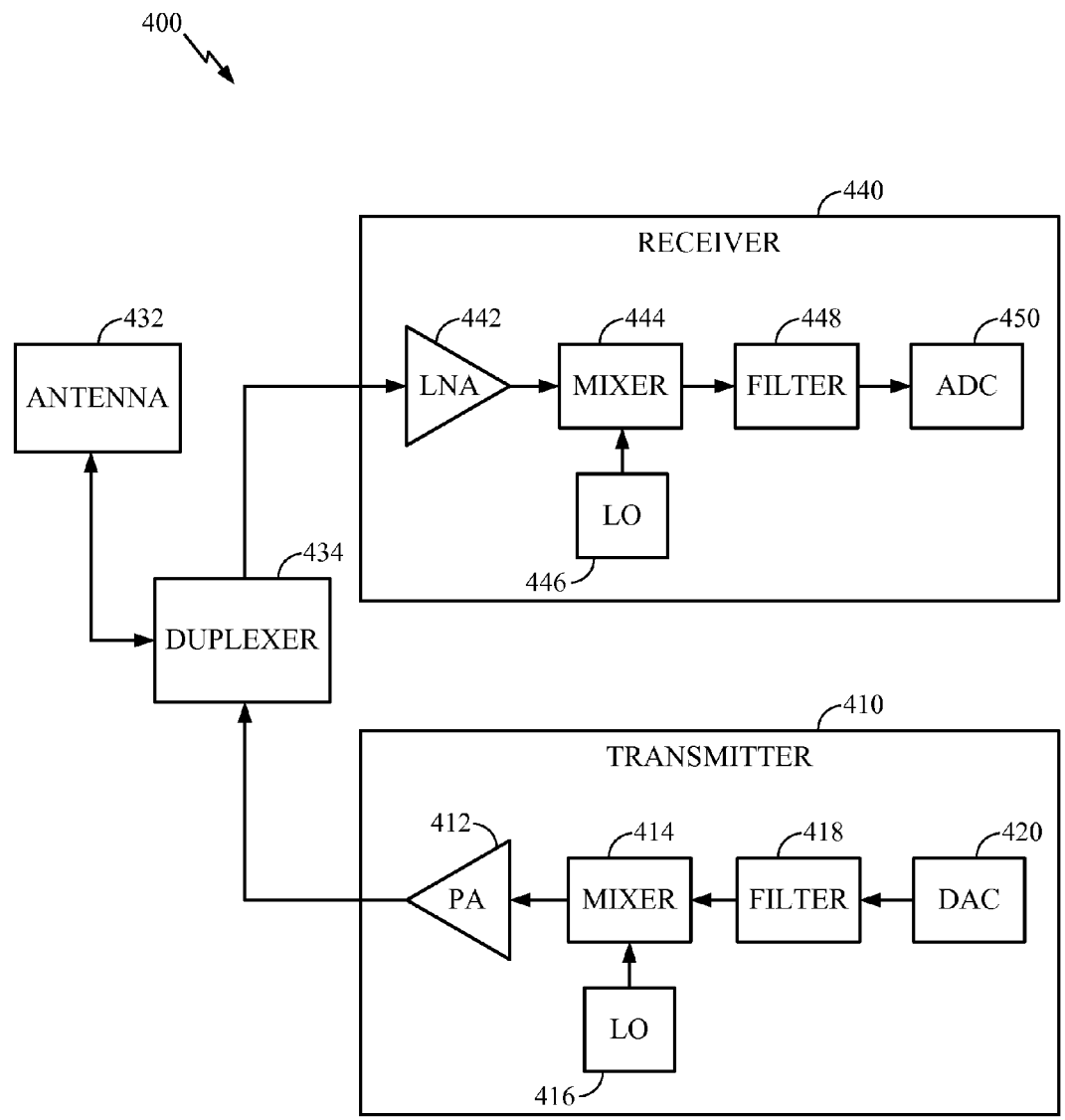
FIG. 4 depicts an example of a wireless device in accordance with various aspects disclosed herein.

FIG. 4 is a block diagram of a wireless device 400 including a transmitter 410 and a receiver 440. Transmitter 410 includes a power amplifier (PA) 412, a mixer 414, an LO 416, an analog filter 418, and a digital-to-analog converter (DAC) 420. Receiver 440 comprises an LNA 442, a mixer 444, an LO 446, an analog filter 448, and an ADC 450. In some aspects, ADC 450 and/or DAC 420 may be included inside a baseband IC (not shown). In some aspects, PA 412 may be separate from the transmitter RFIC. Wireless device 400 may use various techniques for communication such as, for example, CDMA, TDMA, FDMA, OFDMA, and/or other communication techniques.

On the transmit path, transmit data is supplied to DAC 420 which converts the digital data signal into an analog signal. The analog signal is then filtered via analog filter 418. Mixer 414 modulates a transmit local oscillator signal supplied by LO 416 with the analog data signal, and provides a modulated RF signal. The modulated RF signal is then amplified by amplifier 412 and a transmit signal is then routed through a duplexer 434 and transmitted via an antenna 432.

On the receive path, antenna 432 receives a transmitted signal, and duplexer 434 routes the received signal from antenna 432 to amplifier 442. Mixer 444 demodulates the amplified signal with a receive local oscillator signal supplied by LO 446, and provides a baseband signal. Analog filter 448 filters the baseband signal to remove noise and other components, and provides a filtered signal. The filtered analog signal is then converted to a digital signal via ADC 450.

In addition to the transmitted signal, antenna 432 may also receive interference signals, such as signals transmitted by other base stations or a portion of the transmit signal leaking from amplifier 412. The transmitter leakage may generate a jammer signal which, depending on the sampling frequency of ADC, may alias into the desired signal bandwidth. Thus, according to some aspects, the sampling frequency of ADC 450 may be calculated and adjusted such that an aliased transmitter leakage component does not fall into the desired signal bandwidth. Adjustments to the sampling frequency may be made automatically if there are any changes to the operating environment, such as a channel change.

Figure 5:
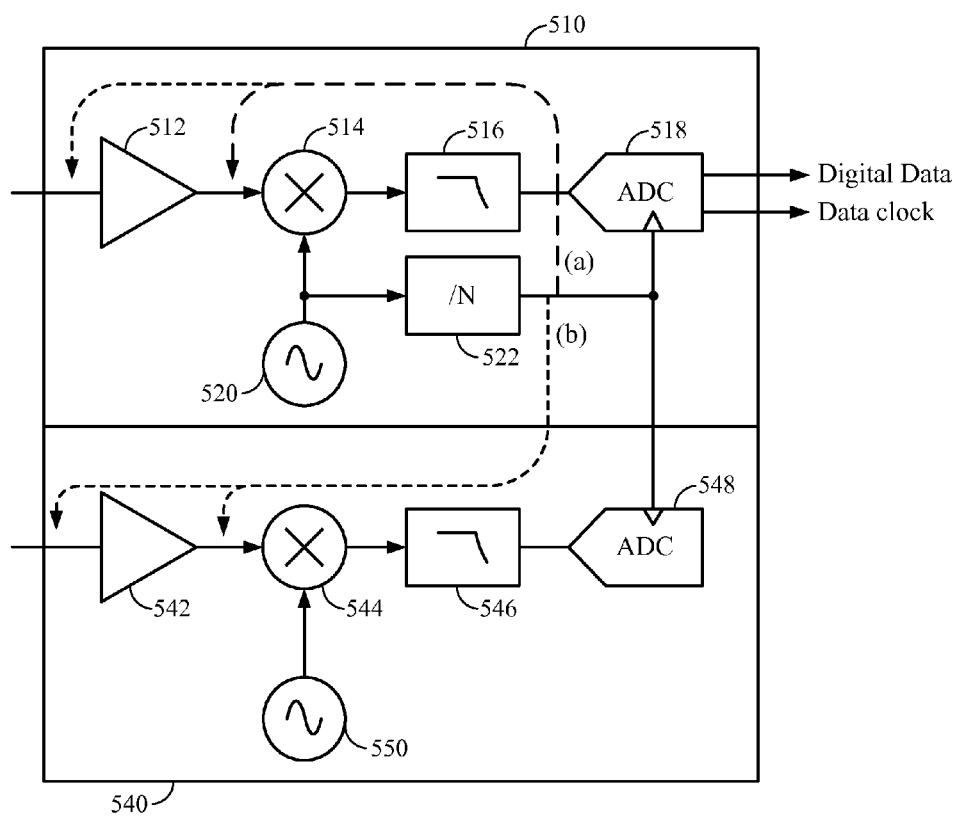
FIG. 5 depicts another example of a wireless device in accordance with various aspects disclosed herein.

Dynamically adjusting the sampling frequency may also be used to prevent sampling clock harmonics from falling inside the RF signal bandwidth of an active receiver in a user device. FIG. 5 depicts a block diagram of an electronic device having two receiver components housed therein. A first receiver 510 may comprise a first amplifier 512, a first mixer 514, a first filter 516, a first ADC 518, a first oscillator 520, and a first divider 522. A second receiver 540 may comprise a second amplifier 542, a second mixer 544, a second filter 546, a second ADC 548, and a second oscillator 550. According to some aspects, first receiver 510 may be of a first communication type while second receiver 540 may be a of a second communication type different from the first receiver 510. According to some aspects, one or both of ADC 518 and ADC 548 may be included on a baseband IC (not shown). For example, each of the first receiver 510 and the second receiver 540 may employ CDMA, FDMA, TDMA, and/or other communication protocols. According to some aspects, first receiver 440 and second receiver 540 may employ the same communication protocol.

FIG. 5 will be explained, by way of example, wherein first receiver 510 is a GPS receiver and second receiver 540 is a CDMA receiver. However, other configurations may be used. The sample clock generated in first receiver 510 may generate interference due to the amount of circuitry being clocked. For example, as depicted at path (a), harmonics of the sampling frequency of ADC 518 may couple into the receiver RF section. However, any in-band harmonics generated on this path may fall exactly at the LO frequency since the receiver's oscillator 520 is used to generate the sampling frequency with an integer divider. Accordingly, if there is sufficiently little signal energy at low frequencies then a high-pass filter (not shown) may be used to remove the interfering clock harmonic.

Harmonics may also fall in the receive band of second receiver 540, as depicted at path (b). According to some aspects, the sampling frequency of the second receiver is not generated by oscillator 550, but rather by first oscillator 520. As such, the sample clock may have a harmonic component falling inside the RF signal bandwidth of another active receiver in the user device, such as second receiver 540. Digital signals in the sample clock domain may couple to sensitive amplifier/mixer circuits, where a harmonic component may create an in-band jammer. The jammer may be, for example, substantially unmodulated if the coupling is predominately from the clock signal, or it may have broader bandwidth if there is significant coupling from the data signals.

According to various aspects, the sampling frequency generated in first receiver 440 may be dynamically adjusted such that no multiple $N*F_S$ (where $F_S$ is the sampling frequency) falls inside the RF signal bandwidth for any active receiver in the user device, such as second receiver 540. Thus, a processor (such as the processor/controller depicted in FIG. 3) controlling the receivers may be configured to maintain a database of the frequencies in use by all active receivers in the system. In some aspects, software and/or firmware controlling the receiver may also be used to control the co-located receiver. Accordingly, frequency information and/or band and channel information associated with the co-located receivers may be passed to the code module associated with the first receiver in real time. In some aspects, the first receiver code module may periodically request frequency information from code modules associated with the co-located receivers via a high-level application programming interface (API). Other methods may also be used. According to some aspects, each receiver has its own processor which stores frequency information for all other receivers. In other aspects, a single processor is used to control all active receivers. An appropriate sampling frequency may be calculated and adjusted whenever an active receiver (e.g., first receiver 510, second receiver 540) is tuned to a new channel. For example, for a CDMA receiver, the sampling frequency may be calculated and adjusted during a hard handoff.

Figure 6:
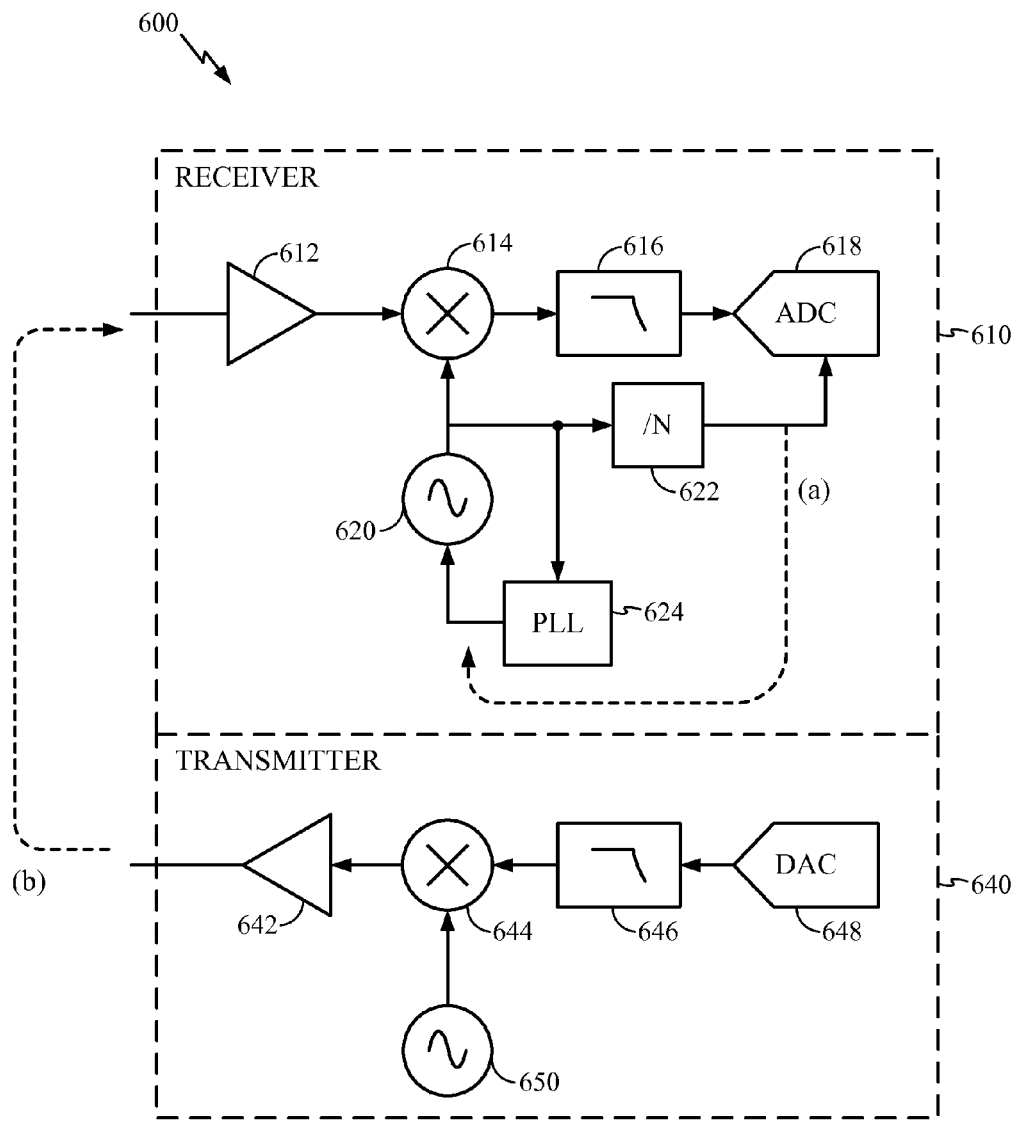
FIG. 6 depicts yet another example of a wireless device in accordance with various aspects disclosed herein.

Dynamically adjusting the sampling frequency may also be used to mitigate the effects of potential LO spurs mixing with an RF jammer FIG. 6 depicts a user device 600 comprising a receiver 610 and a transmitter 640. Receiver 610 may comprise an amplifier 612, a mixer 614, a filter 616, an ADC 618, an oscillator 620, a divider 622, and a phase-locked loop (PLL) 624. Transmitter 640 may comprise an amplifier 642, mixer 644, filter 646, DAC 648, and oscillator 650. According to some aspects, receiver 610 and transmitter 640 operate using different communication protocols. In some aspects, the same communication protocol may be used. One or both of ADC 618 and DAC 648 may be located on a baseband IC (not shown), in accordance with some aspects. FIG. 6 will be described wherein receiver 610 is a GPS receiver and transmitter 640 is a CDMA transmitter. However, it is noted that this is merely an exemplary configuration, and any other receiver/transmitter combination may be used.

As depicted in FIG. 6, oscillator 620 may be used to generate a sampling clock through divider 622. Path (a) indicates possible coupling of sampling clock/data signals to the GPS synthesizer. More particularly, PLL 624 may generate a tuning voltage for oscillator 620. However, clock and/or data signals from ADC 618 may couple to the tuning port of oscillator 620, and modulate the oscillator control voltage. As a result, the output of the oscillator may include spurious components at frequency offsets $N*F_S$ from the desired oscillator frequency. Through oscillator self-mixing, these spurs may appear as CW jammers at the receiver output, and/or they may mix with transmitter leakage to create broadband interference resembling jammer aliasing.

As described above, a co-located transmitter, such as CDMA transmitter 640 may generate transmit signal leakage, indicated by path (b). The transmitter leakage may generate a baseband jammer that is the mixing product of the leakage and the fundamental tone of oscillator 620. A CW spur on oscillator 620 will also mix with the transmitter leakage to create a second baseband jammer at a different frequency. Given sampling frequency $F_S$ of ADC 618 and fundamental frequency $F_{LO}$ of oscillator 620, the RF frequency of the transmitter leakage may be written as $F_{TX}=F_{LO}+N*F_S+\Delta F$, where N is an integer and $|\Delta F|<F_S/2$. If the oscillator spur has a frequency offset $N*F_S$ from the oscillator fundamental, then the second baseband jammer has a frequency of $F_J=\Delta F$. At the ADC output, this second baseband jammer is indistinguishable from aliasing of the first baseband jammer.

Figure 7A:
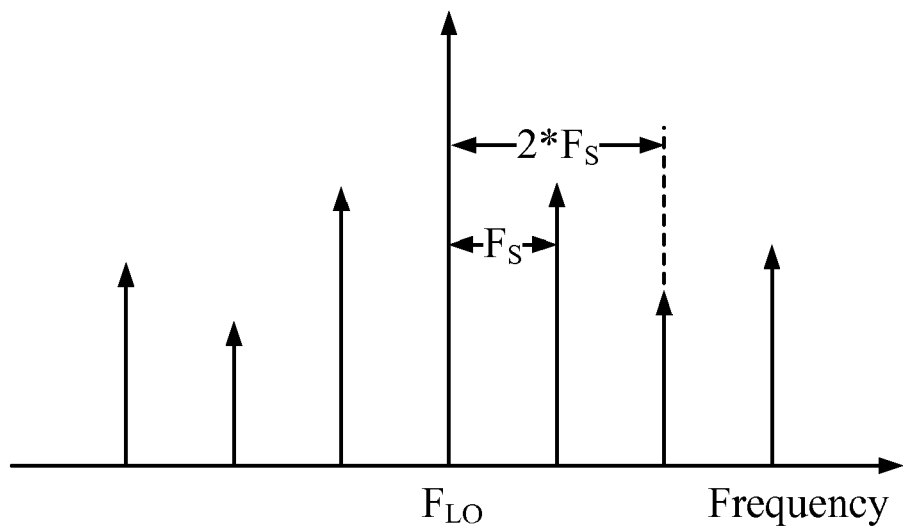
FIGS. 7A-7C depict signal spectra associated with the wireless device of FIG. 5.
Figure 7B:
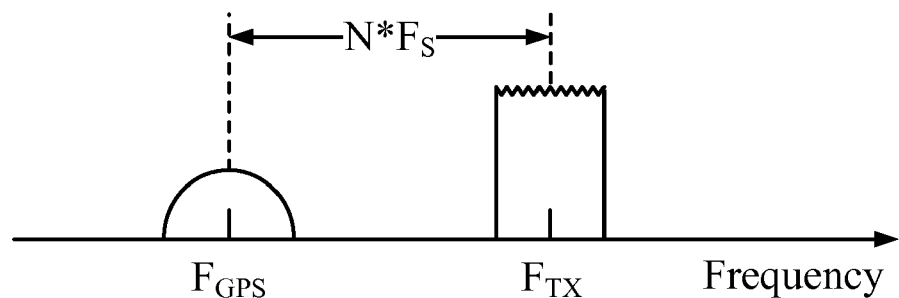
Figure 7C:
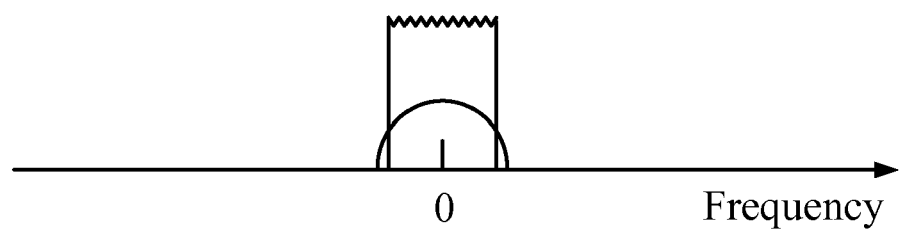

FIG. 7A depicts the LO spectrum for oscillator 620. As depicted, a spur may occur at offset $N*F_S$ for any integer N. FIG. 7B depicts the frequency spectrum of signals input to receiver 610. The desired GPS signal at center frequency $F_{GPS}$ is present, and undesired transmitter leakage at center frequency $F_{TX}$ is also present. The transmitter leakage signal may mix with an LO spur, generating baseband spectrum as depicted in FIG. 7C. That is, the desired GPS signal bandwidth is occupied by a jammer signal representing the transmitter leakage mixing with the oscillator spur.

In accordance with various aspects, the sampling frequency may be dynamically chosen to avoid mixing a jammer signal with an oscillator spur. The sampling frequency may be chosen such that no mixing products of a jammer with oscillator spurs at frequency offsets $N*F_S$ will fall into the baseband signal bandwidth. The sampling frequency may be dynamically adjusted as the jammer frequency changes.

Figure 8:
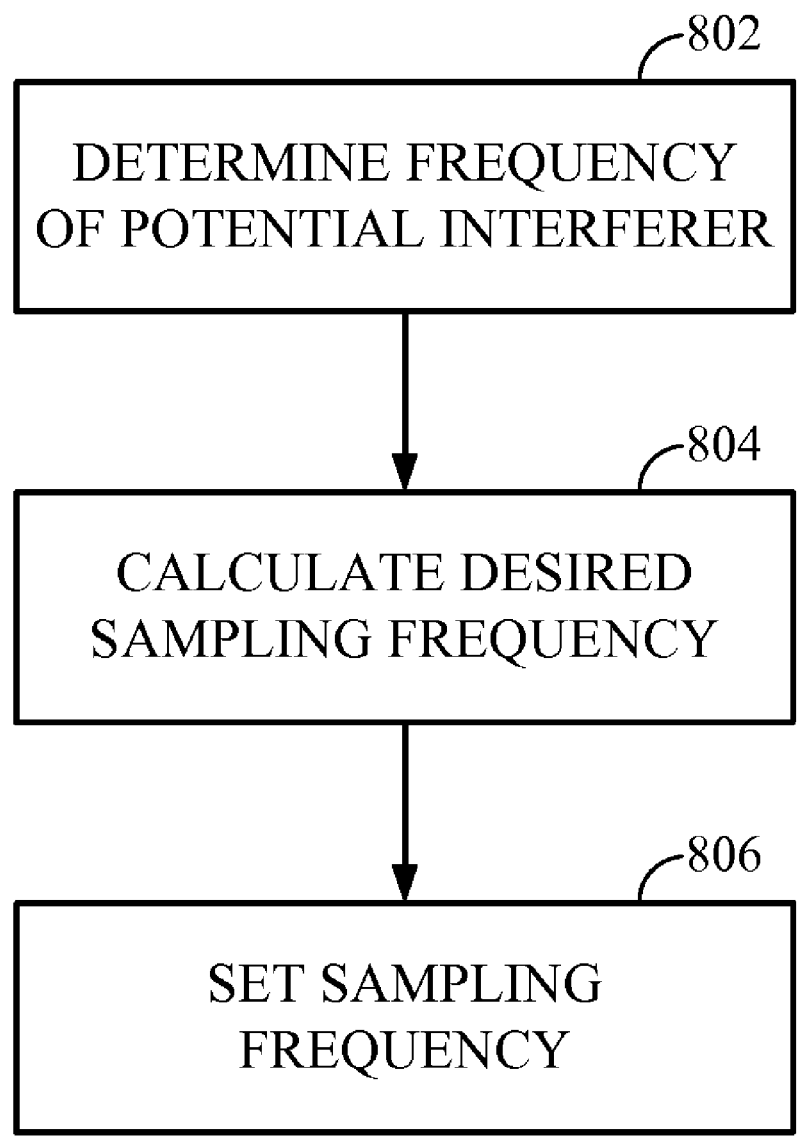
FIG. 8 depicts one aspect of a method for avoiding receiver interference.

FIG. 8 depicts one aspect of a method for avoiding receiver interference. As depicted at 802, the frequency of one or more potential interfering signal components is determined. As depicted at 804, a desired sampling frequency for the receiver may be calculated such that each of the one or more potential interfering signals does not occupy the receiver's desired baseband signal bandwidth. As depicted at 806, the sampling frequency for the receiver may be set to the calculated desired sampling frequency.

Figure 9:
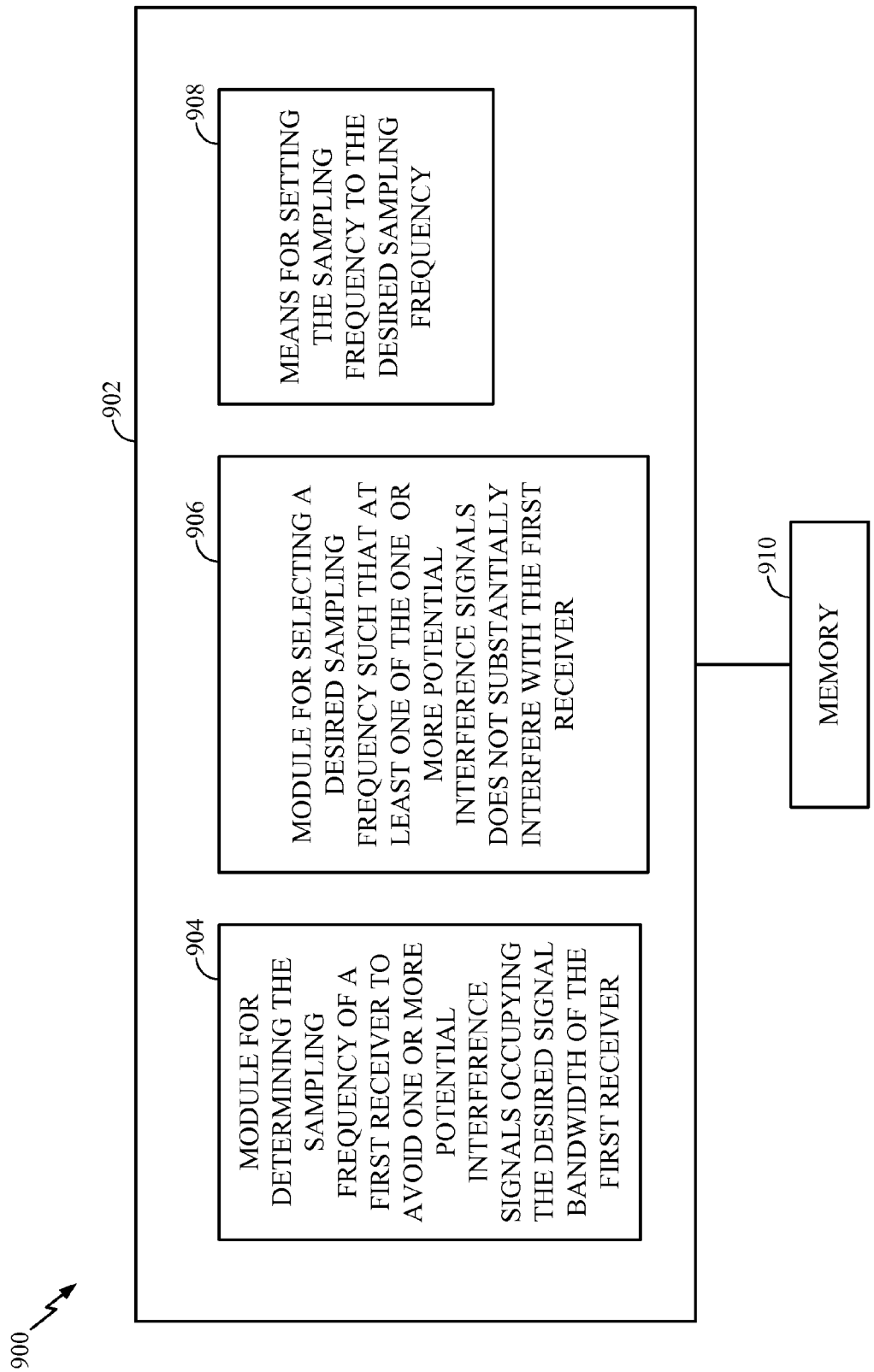
FIG. 9 depicts an example of a system for determining and adjusting a sampling frequency.

With reference to FIG. 9, illustrated is a system 900 that receives and processes messages received over a wireless network. For example, system 900 can reside at least partially within a receiver, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include a module for determining the frequency of one or more potential interfering signal components 904. For example, interference may be potentially caused by a portion of a transmitter's signal leaking into the receiver circuitry and aliasing in-band in the receiver ADC, by coupling of ADC sampling clock harmonics into sensitive receiver LNA and/or mixer circuitry, or by receiver LO spurs generated by an ADC sampling clock mixing with a signal leaking from a transmitter into the receiver, and/or other interference sources.

Further, logical grouping 902 can comprise a module for calculating a desired sampling frequency for the receiver such that each of the one or more potential interference signals does not occupy the receiver's desired baseband signal bandwidth 906. Furthermore, logic grouping 902 may comprise a module for setting the sampling frequency to the desired sampling frequency 908.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus, comprising:
a first receiver comprising a radio frequency integrated circuit (RFIC), the first receiver having a desired receive signal band;
a baseband integrated circuit (IC), the baseband IC being separate from the RFIC;
an analog-to-digital converter (ADC) sample clock signal routed between the RFIC and the baseband IC; and
at least one processor configured to dynamically adjust a sampling frequency to avoid one or more potential interference signals interfering with the desired receive signal band of the first receiver, wherein:
the one or more potential interference signals are generated, at least in part, by a second receiver, a co-located transmitter, or the ADC sample clock signal,
the RFIC comprises an ADC, and
the ADC sample clock signal is generated on the RFIC and routed to the baseband IC.

2. The apparatus of claim 1, wherein the at least one processor comprises:
an interference determination module for determining the frequency of one or more potentially interfering signal components;
a sampling frequency selection module for selecting a desired sampling frequency such that at least one of the one or more potentially interfering signal components does not substantially interfere with the first receiver operation; and
a sampling frequency setting module for setting the sampling frequency to the desired sampling frequency.

3. The apparatus of claim 2, wherein:
at least one of the one or more potentially interfering signal components is a jammer signal;
sampling the jammer signal potentially causes the jammer signal to alias into the first receiver's desired signal band, and
the sampling frequency selection module is configured to determine, via calculation or a look-up table, a sampling frequency $F_S$ such that at the ADC input the spectrum of the jammer, modulo $F_s$, does not substantially overlap the desired signal spectrum.

4. The apparatus of claim 3, wherein the first receiver has a zero IF architecture and the sampling frequency is selected to make $F_J$ mod $F_S$ greater than half of $BW_J+BW_S$, where $F_J$ is the frequency of the jammer, $BW_J$ is the bandwidth of the jammer, and $BW_S$ is the bandwidth of the signal.

5. The apparatus of claim 2, wherein the source of at least one of the potentially interfering signal components is a harmonic of the sampling frequency of the first receiver, and wherein the sampling frequency selection module is configured to:
determine, via calculation or a look-up table, a sampling frequency such that no multiple $N*F_S$, where $F_S$ is the sampling frequency of the receiver and N is a positive integer, falls in the desired signal spectrum.

6. The apparatus of claim 2, wherein at least one of the potentially interfering signal components may be down-converted into the first receiver's desired signal IF band by one or more spurious components of the first receiver local oscillator (LO), and wherein the one or more LO spurious components is a harmonic of the first receiver's sampling frequency, and wherein the sampling frequency selection module is configured to:
determine, via calculation or look-up table, a sampling frequency $F_S$ such that the mixing products of the jammer with LO spurious components at frequency offsets $N*F_S$ have a spectrum that does not substantially overlap the desired signal spectrum.

7. The apparatus of claim 2, wherein the sampling frequency selection module is further configured to select a sampling frequency whenever the first receiver is tuned to a new channel.

8. The apparatus of claim 1, further comprising:
at least one transmitter,
wherein at least one of the potentially interfering signal components couples into the receiver from at least one transmitter.

9. The apparatus of claim 2, further comprising:
at least one second receiver,
wherein at least one of the potentially interfering signal components couples into the first receiver from ADC circuits of the second receiver.

10. The apparatus of claim 9, wherein the source of at least one of the potentially interfering signal components is a harmonic of the sampling frequency of the second receiver, and wherein the sampling frequency selection module is configured to:

determine, via calculation or look-up table, a sampling frequency such that no multiple $N*F_S^{(2)}$, where $F_S^{(2)}$ is the sampling frequency of the at least one second receiver and N is a positive integer, falls in the first receiver's desired signal spectrum.

11. The apparatus of claim 9, wherein at least one of the potentially interfering signal components may be down-converted into the first receiver's desired signal IF band by one or more spurious components of the first receiver's local oscillator (LO), and wherein the one or more LO spurious components is a harmonic of the sampling frequency of the at least one second receiver, and wherein the sampling frequency selection module is configured to:

determine, via calculation or look-up table, a sampling frequency $F_S^{(2)}$ such that the mixing products in the first receiver of the jammer with LO spurious components at frequency offsets $N*F_S^{(2)}$ have a spectrum that does not substantially overlap the first receiver's desired signal spectrum.

12. At least one processor configured to avoid interference with a first receiver, wherein the first receiver interfaces to an analog-to-digital converter (ADC) sample clock routed between a radio frequency integrated circuit and a separate baseband integrated circuit, the at least one processor comprising:

a first module for determining the frequency of one or more undesired signals that potentially interfere with the first receiver, wherein:
the one or more undesired signals are generated, at least in part, by a second receiver, a co-located transmitter, or the ADC sample clock,
the radio frequency integrated circuit comprises an ADC, and
the ADC sample clock signal is generated on the radio frequency integrated circuit and routed to the baseband integrated circuit;
a second module for selecting a desired sampling frequency such that at least one of the one or more potentially interfering signal components does not substantially interfere with the first receiver; and
a third module for setting the sampling frequency to the desired sampling frequency.

13. A computer program product, comprising:
a computer-readable medium comprising a processor interfacing to a first receiver interfacing to an analog-to-digital converter (ADC) sample clock signal routed between an RFIC and a separate baseband IC, the computer-readable medium further comprising:
a first set of codes for causing a computer to determine the frequency of one or more undesired signals that potentially interfere with the first receiver, wherein:
the one or more undesired signals are generated, at least in part, by a second receiver, a co-located transmitter, or the ADC sample clock signal,
the RFIC comprises an ADC, and
the ADC sample clock signal is generated on the RFIC and routed to the baseband IC;
a second set of codes for causing the computer to select a desired sampling frequency such that at least one of the one or more potentially interfering signal components does not substantially interfere with the first receiver; and
a third set of codes for causing the computer to set the sampling frequency to the desired sampling frequency.

14. An apparatus, comprising:
a first receiver having an RFIC and a baseband IC separate from the RFIC, wherein a clock signal is routed between the RFIC and the baseband IC;
means for determining the sampling frequency of the first receiver to avoid one or more potential interference signals occupying the desired baseband signal bandwidth of the first receiver, wherein:
the one or more potential interference signals are generated, at least in part, by a second receiver, a co-located transmitter, or a clock signal, and
the clock signal is generated on the RFIC and routed to the baseband IC;
means for selecting a desired sampling frequency such that at least one of the one or more potential interference signals does not substantially interfere with the first receiver; and
means for setting the sampling frequency to the desired sampling frequency.

15. A method for avoiding receiver interference in systems wherein an analog-to-digital converter (ADC) sample clock is routed between separate radio frequency (RF) and baseband integrated circuits (ICs), and wherein the method comprises:

determining a frequency of one or more undesired signals that potentially interfere with a first receiver, wherein:
the one or more undesired signals are generated, at least in part, by a second receiver, a co-located transmitter, or the ADC sample clock, and
the RF integrated circuit comprises an ADC;
generating an ADC sample clock signal on the RF integrated circuit;
routing the ADC sample clock signal to the baseband IC;
selecting a desired sampling frequency such that at least one of the one or more undesired signals does not substantially interfere with the first receiver; and
setting the sampling frequency to the desired sampling frequency.

16. The method of claim 15, wherein routing the ADC sample clock signal comprises routing the ADC sample clock signal together with one or more digital data signals to the baseband IC.

17. The method of claim 15, wherein the first receiver is co-located with one or more transmitters, and wherein at least one of the undesired signals couples into the first receiver from a co-located transmitter.

18. The method of claim 17, wherein selecting the sampling frequency is performed whenever at least one co-located transmitter is tuned to a new channel.

19. The method of claim 15, wherein the first receiver is co-located with one or more second receivers, and wherein at least one of the undesired signals couples into the first receiver from ADC-related circuits of a co-located second receiver, wherein ADC-related circuits include, in addition to the ADC core circuits, any sample clock generation circuits and input/output buffer circuits essential to ADC operation.

20. The method of claim 19, wherein selecting the sampling frequency of at least one co-located second receiver is performed whenever the second receiver is tuned to a new channel.

21. The method of claim 15, wherein at least one of the one or more undesired signals is a jammer signal, wherein sampling the jammer signal potentially causes the jammer signal to alias into a desired signal band of the first receiver, and wherein selecting a desired sampling frequency comprises:
determining, via calculation or look-up table, a sampling frequency $F_S$ such that at the ADC input the spectrum of the jammer, modulo $F_s$, does not substantially overlap the desired signal spectrum.

22. The method of claim 21, wherein the first receiver has a zero IF architecture and the sampling frequency is selected to make $F_J$ mod $F_S$ greater than half of $BW_J+BW_S$, where $F_J$ is the frequency of the jammer, $BW_J$ is the bandwidth of the jammer, and $BW_S$ is the bandwidth of the signal.

23. The method of claim 15, wherein a source of at least one of the undesired signals is a harmonic of the sampling frequency of the first receiver, and wherein selecting a desired sampling frequency comprises:

determining, via calculation or a look-up table, a sampling frequency such that no multiple $N*F_S$, where $F_S$ is the sampling frequency of the first receiver and N is a positive integer, falls in the desired signal spectrum.

24. The method of claim 15, wherein a source of at least one of the undesired signals is a harmonic of the sampling frequency of a co-located second receiver, and wherein selecting a desired sampling frequency of the second receiver comprises:

determining, via calculation or look-up table, a sampling frequency such that no multiple $N*F_S^{(2)}$, where $F_S^{(2)}$ is the sampling frequency of the co-located second receiver and N is a positive integer, falls in the first receiver's desired signal spectrum.

25. The method of claim 15, wherein at least one of the undesired signals is down-converted into a desired signal IF band of the first receiver by one or more spurious components of a local oscillator (LO) of the first receiver, and wherein the one or more LO spurious components is a harmonic of a sampling frequency of the first receiver, and wherein selecting a desired sampling frequency comprises:

determining, via calculation or look-up table, a sampling frequency $F_S$ such that the mixing products of the jammer with LO spurious components at frequency offsets $N*F_S$ have a spectrum that does not substantially overlap the desired signal IF band.

26. The method of claim 15, wherein at least one of the undesired signals is down-converted into a desired signal IF band of the first receiver by one or more spurious components of the first receiver's local oscillator (LO), and wherein the one or more LO spurious components is a harmonic of the sampling frequency of a co-located second receiver, and wherein selecting a desired sampling frequency of the second receiver comprises:

determining, via calculation or look-up table, a sampling frequency $F_S^{(2)}$ such that the mixing products in the first receiver of the jammer with LO spurious components at frequency offsets $N*F_S^{(2)}$ have a spectrum that does not substantially overlap the desired signal IF band.

27. The method of claim 15, wherein selecting the sampling frequency is performed whenever the first receiver is tuned to a new channel.

* * * * *